(12) United States Patent
Gormley

(10) Patent No.: US 11,560,841 B2
(45) Date of Patent: Jan. 24, 2023

(54) AIRCRAFT PROPULSION SYSTEM WITH VARIABLE AREA INLET

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 17/358,974

(22) Filed: Jun. 25, 2021

(65) Prior Publication Data

US 2022/0412257 A1    Dec. 29, 2022

(51) Int. Cl.
*F02C 7/042*    (2006.01)

(52) U.S. Cl.
CPC ........ *F02C 7/042* (2013.01); *F05D 2220/323* (2013.01); *F05D 2240/121* (2013.01)

(58) Field of Classification Search
CPC ...... F02C 7/04; F02C 7/042; F05D 2220/323; F05D 2240/121
See application file for complete search history.

(56) References Cited

U.S. PATENT DOCUMENTS

| | | |
|---|---|---|
| 2,677,232 A | 5/1954 | Collins |
| 2,876,621 A | 3/1959 | Bogert |
| 2,934,893 A * | 5/1960 | Streeter .................. F02C 7/042 137/15.1 |
| 2,955,414 A | 10/1960 | Hausmann |
| 3,058,693 A | 10/1962 | Doak |
| 3,172,253 A | 3/1965 | Schelp |
| 3,176,462 A | 4/1965 | Eckert |
| 3,199,810 A | 8/1965 | Stroud |
| 3,495,605 A | 2/1970 | Gunnarson |
| 3,618,876 A | 11/1971 | Skidmore |
| 3,664,612 A | 5/1972 | Skidmore |
| 3,974,648 A | 8/1976 | Kepler |
| 4,007,891 A | 2/1977 | Sorensen |
| 4,132,240 A | 1/1979 | Frantz |
| 4,620,679 A | 11/1986 | Karanian |
| 5,014,933 A | 5/1991 | Harm |
| 5,088,660 A | 2/1992 | Karanian |
| 5,881,758 A | 3/1999 | Koncsek |
| 6,276,632 B1 | 8/2001 | Sanders |
| 6,793,175 B1 | 9/2004 | Sanders |

(Continued)

FOREIGN PATENT DOCUMENTS

WO    2009115674 A2    9/2009

*Primary Examiner* — Steven M Sutherland
(74) *Attorney, Agent, or Firm* — Getz Balich LLC

(57) ABSTRACT

An assembly includes a variable area inlet and an inlet duct. The variable area inlet includes an inlet structure and a center body structure. The inlet structure extends circumferentially about the center body structure with an outer inlet passage radially between the center body structure and the inlet structure. The center body structure includes an outer body and an inner body. The outer body extends circumferentially about the inner body with an inner inlet passage radially between the inner and outer bodies. The inner body is configured to move along a centerline relative to the outer body between a first position and a second position. The inlet duct is fluidly coupled with the outer inlet passage when the inner body is in the first position. The inlet duct is fluidly coupled with the outer inlet passage and the inner inlet passage when the inner body is in the second position.

15 Claims, 8 Drawing Sheets

(56) References Cited

U.S. PATENT DOCUMENTS

| | | |
|---|---|---|
| 7,837,142 B2 | 11/2010 | Chase |
| 8,181,905 B2 | 5/2012 | Mcdonough |
| 8,690,097 B1 | 4/2014 | Huynh |
| 9,908,633 B2 | 3/2018 | Huynh |
| 10,107,196 B2 | 10/2018 | Devine |
| 10,221,764 B2 | 3/2019 | Labrecque |
| 10,308,368 B2 | 6/2019 | Pastouchenko |
| 2017/0321633 A1 | 11/2017 | Boileau |
| 2018/0371996 A1 | 12/2018 | Hoisington |

\* cited by examiner

AIRCRAFT PROPULSION SYSTEM WITH VARIABLE AREA INLET

BACKGROUND

1. Technical Field

This disclosure relates generally to an aircraft propulsion system and, more particularly, to an inlet for the aircraft propulsion system with a variable airflow inlet area.

2. Background Information

An aircraft propulsion system may include an inlet structure and a gas turbine engine. The inlet structure directs air into the gas turbine engine. Some known inlet structures include a variable airflow inlet area for tailoring a mass flow of the air entering the gas turbine engine. While these known inlet structures have various advantages, there is still room in the art for improvement. There is a need in the art therefore for an improved inlet assembly with a variable airflow inlet area.

SUMMARY OF THE DISCLOSURE

According to an aspect of the present disclosure, an assembly is provided for an aircraft propulsion system. This aircraft propulsion system assembly includes a variable area inlet and an inlet duct. The variable area inlet includes an inlet structure and a center body structure. The inlet structure extends circumferentially about the center body structure with an outer inlet passage radially between the center body structure and the inlet structure. The center body structure includes an outer body and an inner body. The outer body extends circumferentially about the inner body with an inner inlet passage radially between the inner body and the outer body. The inner body is configured to move along a centerline relative to the outer body between a first position and a second position. The inlet duct is fluidly coupled with the outer inlet passage when the inner body is in the first position. The inlet duct is fluidly coupled with the outer inlet passage and the inner inlet passage when the inner body is in the second position.

According to another aspect of the present disclosure, another assembly is provided for an aircraft propulsion system. This aircraft propulsion system assembly includes a variable area inlet and an inlet duct. The variable area inlet includes an outer inlet passage, an inner inlet passage, an inlet structure and a center body structure. The outer inlet passage is formed radially between the inlet structure and the center body structure. The inner inlet passage is formed within the center body structure. The center body structure includes a needle and seat valve configured to variably regulate air flow through the inner inlet passage. The inlet duct is configured to receive air from the outer inlet passage and the inner inlet passage.

According to still another aspect of the present disclosure, another assembly is provided for an aircraft propulsion system. This aircraft propulsion system assembly includes a variable area inlet and a gas turbine engine. The variable area inlet includes an inlet structure, an outer body and an inner body. The inlet structure extends circumferentially about the outer body with an outer inlet passage formed by and radially between the inlet structure and the outer body. The outer body extends circumferentially about the inner body with an inner inlet passage formed by and radially between the outer body and the inner body. A component of the variable area inlet is configured to move along a centerline between a first position and a second position. The component of the variable area inlet is configured as or otherwise includes the inner body or the outer body. The gas turbine engine includes a compressor section configured to receive air from the outer inlet passage and the inner inlet passage when the component of the variable area inlet is at least in the second position.

The needle and seat valve may be configured to: open the inner inlet passage during a first mode; and at least partially close the inner inlet passage during a second mode.

The needle and seat valve may include a tubular seat and a needle. The tubular seat may circumscribe the needle. The needle may be configured to translate along a centerline relative to the tubular seat between a forward position and an aft position.

The tubular seat may be a stationary body within the aircraft propulsion system.

The center body structure may be configured to fluidly decouple the inlet duct from the inner inlet passage when the inner body is in the first position.

The center body may include a needle and seat valve configured to regulate air flow through the inner inlet passage. The needle and seat valve may include the outer body and the inner body.

The outer inlet passage may be a fixed area passage.

The outer inlet passage may be an annular outer inlet passage.

The inner inlet passage may be an annular inner inlet passage.

The outer body may be configured as or otherwise include a fixed tubular sleeve.

The assembly may also include one or more struts fixedly connecting the outer body to the inlet structure.

The outer body may extend axially along the centerline between an upstream end of the outer body and a downstream end of the outer body. The center body may be configured to close the inner inlet passage when the outer body engages the inner body at the upstream end of the outer body.

The outer body may extend axially along the centerline between an upstream end of the outer body and a downstream end of the outer body. The center body may be configured to close the inner inlet passage when the outer body engages the inner body at the downstream end of the outer body.

The outer body may include a first outer surface and a second outer surface. The first outer surface may taper radially inward as the outer body extends axially in a first direction along the centerline. The second outer surface may taper radially inward as the outer body extends axially in a second direction along the centerline.

The inner body may include a first outer surface, a second outer surface and a third outer surface. The first outer surface may taper radially inward as the inner body extends axially in a first direction along the centerline. The second outer surface may taper radially inward as the inner body extends axially in the first direction along the centerline. The third outer surface, which may be disposed axially between the first outer surface and the second outer surface, may be non-radially tapered.

A flow area of the outer inlet passage may be different than a flow area of the inner inlet passage.

The inlet duct may be configured to direct air received from the outer inlet passage and the inner inlet passage into a core flowpath of the aircraft propulsion system when the inner body is in the second position.

The inlet duct may be configured to direct air received from the outer inlet passage and the inner inlet passage into a bypass flowpath of the aircraft propulsion system when the inner body is in the second position.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
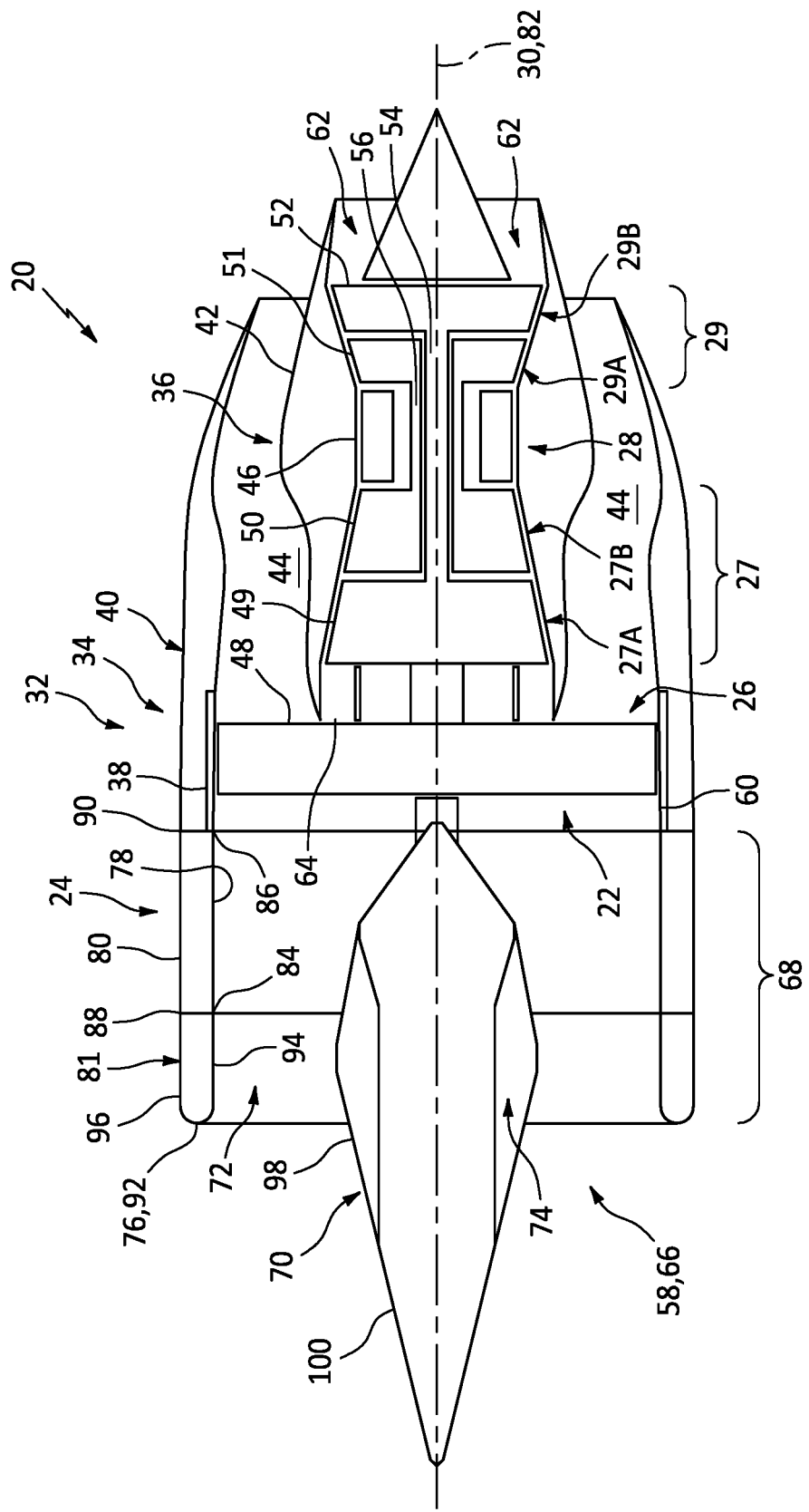
FIG. 1 is a schematic side sectional illustration of an aircraft propulsion system with a variable area inlet in a closed position.

FIG. 1 illustrates an aircraft propulsion system 20 for an aircraft such as, but not limited to, a commercial airliner or cargo plane. The aircraft propulsion system 20 includes a gas turbine engine 22 and a nacelle 24.

The gas turbine engine 22 may be configured as a high-bypass turbofan engine. The gas turbine engine 22 of FIG. 1, for example, includes a fan section 26, a compressor section 27, a combustor section 28 and a turbine section 29. The compressor section 27 may include a low pressure compressor (LPC) section 27A and a high pressure compressor (HPC) section 27B. The turbine section 29 may include a high pressure turbine (HPT) section 29A and a low pressure turbine (LPT) section 29B.

The engine sections 26-29B are arranged sequentially along an axial centerline 30 (e.g., a rotational axis) of the gas turbine engine 22 within an aircraft propulsion system housing 32. This housing 32 includes an outer housing structure 34 and an inner housing structure 36.

The outer housing structure 34 includes an outer case 38 (e.g., a fan case) and an outer structure 40 of the nacelle 24; e.g., an outer nacelle structure. The outer case 38 houses at least the fan section 26. The outer nacelle structure 40 houses and provides an aerodynamic cover for the outer case 38. The outer nacelle structure 40 also covers a portion of an inner structure 42 of the nacelle 24; e.g., an inner nacelle structure, which may also be referred to as an inner fixed structure (IFS). More particularly, the outer nacelle structure 40 axially overlaps and extends circumferentially about (e.g., completely around) the inner nacelle structure 42. The outer nacelle structure 40 and the inner nacelle structure 42 thereby at least partially or completely form an annular bypass flowpath 44 within the aircraft propulsion system 20.

The inner housing structure 36 includes an inner case 46 (e.g., a core case) and the inner nacelle structure 42. The inner case 46 houses one or more of the engine sections 27A-29B, which engine sections 27A-29B may be collectively referred to as an engine core. The inner nacelle structure 42 houses and provides an aerodynamic cover for the inner case 46.

Each of the engine sections 26, 27A, 27B, 29A and 29B includes a bladed rotor 48-52. The fan rotor 48 and the LPC rotor 49 are connected to and driven by the LPT rotor 52 through a low speed shaft 54. The HPC rotor 50 is connected to and driven by the HPT rotor 51 through a high speed shaft 56. The shafts 54 and 56 are rotatably supported by a plurality of bearings (not shown). Each of these bearings is connected to the aircraft propulsion system housing 32 (e.g., the inner case 46) by at least one stationary structure such as, for example, an annular support strut.

During operation, air enters the aircraft propulsion system 20 through an aircraft propulsion system inlet structure 58. This air is directed through an inlet duct 60 (e.g., a fan duct in the fan section 26) and into an annular core flowpath 62 and the bypass flowpath 44. The core flowpath 62 extends axially along the axial centerline 30 within the aircraft propulsion system 20, through the engine sections 27A-29B, to a core nozzle outlet, where the core flowpath 62 is radially within the inner case 46. The bypass flowpath 44 extends axially along the axial centerline 30 within the aircraft propulsion system 20 to a bypass nozzle outlet, where the bypass flowpath 44 is radially between the outer nacelle structure 40 and the inner nacelle structure 42. The air within the core flowpath 62 may be referred to as "core air". The air within the bypass flowpath 44 may be referred to as "bypass air".

The core air is compressed by the compressor rotors 49 and 50 and directed into a combustion chamber of a combustor in the combustor section 28. Fuel is injected into the combustion chamber and mixed with the compressed core air to provide a fuel-air mixture. This fuel-air mixture is ignited and combustion products thereof flow through and sequentially cause the turbine rotors 51 and 52 to rotate. The rotation of the turbine rotors 51 and 52 respectively drive rotation of the compressor rotors 50 and 49 and, thus, compression of the air received from a core airflow inlet 64. The rotation of the LPT rotor 52 also drives rotation of the fan rotor 48, which propels bypass air through and out of the bypass flowpath 44. The propulsion of the bypass air may account for a majority of thrust generated by the turbine engine 22. The aircraft propulsion system 20 of the present disclosure, however, is not limited to the exemplary gas turbine engine configuration described above.

Optimal mass flow requirements of the air entering the aircraft propulsion system 20 through the aircraft propulsion system inlet structure 58 may change depending upon one or more parameters. These parameters may include, but are not limited to, modes of operation, aircraft maneuvers and operating conditions. For example, where the aircraft flies at supersonic speeds, a first mass flow of the air may be directed through the aircraft propulsion system inlet structure 58 into the aircraft propulsion system 20. When the aircraft flies at subsonic speeds, a second mass flow of the air may be directed through the aircraft propulsion system inlet structure 58 into the aircraft propulsion system 20, where the second mass flow is greater than the first mass flow.

Figure 2:
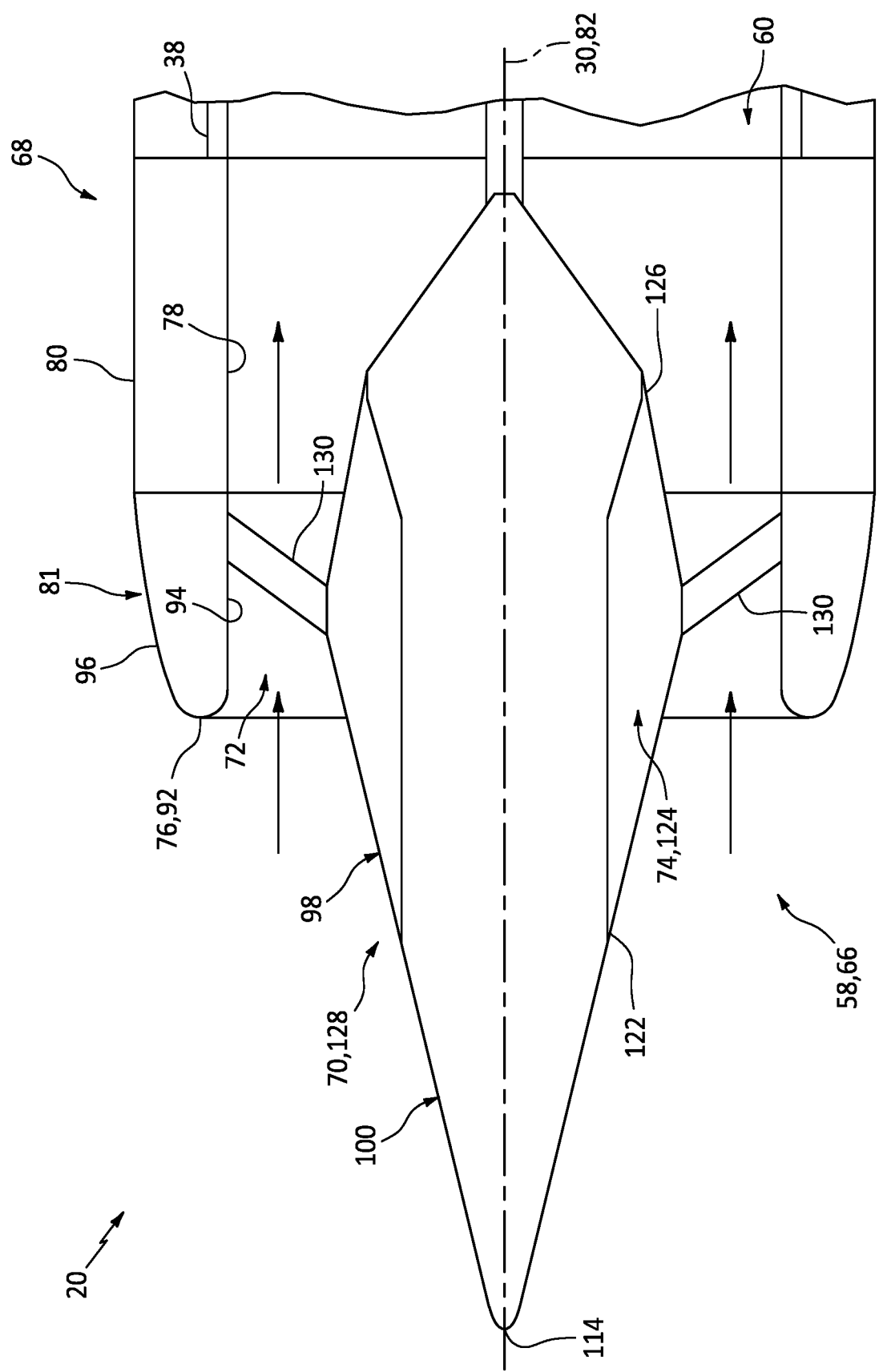
FIG. 2 is a side sectional illustration of the variable area inlet in the closed position.
Figure 3:
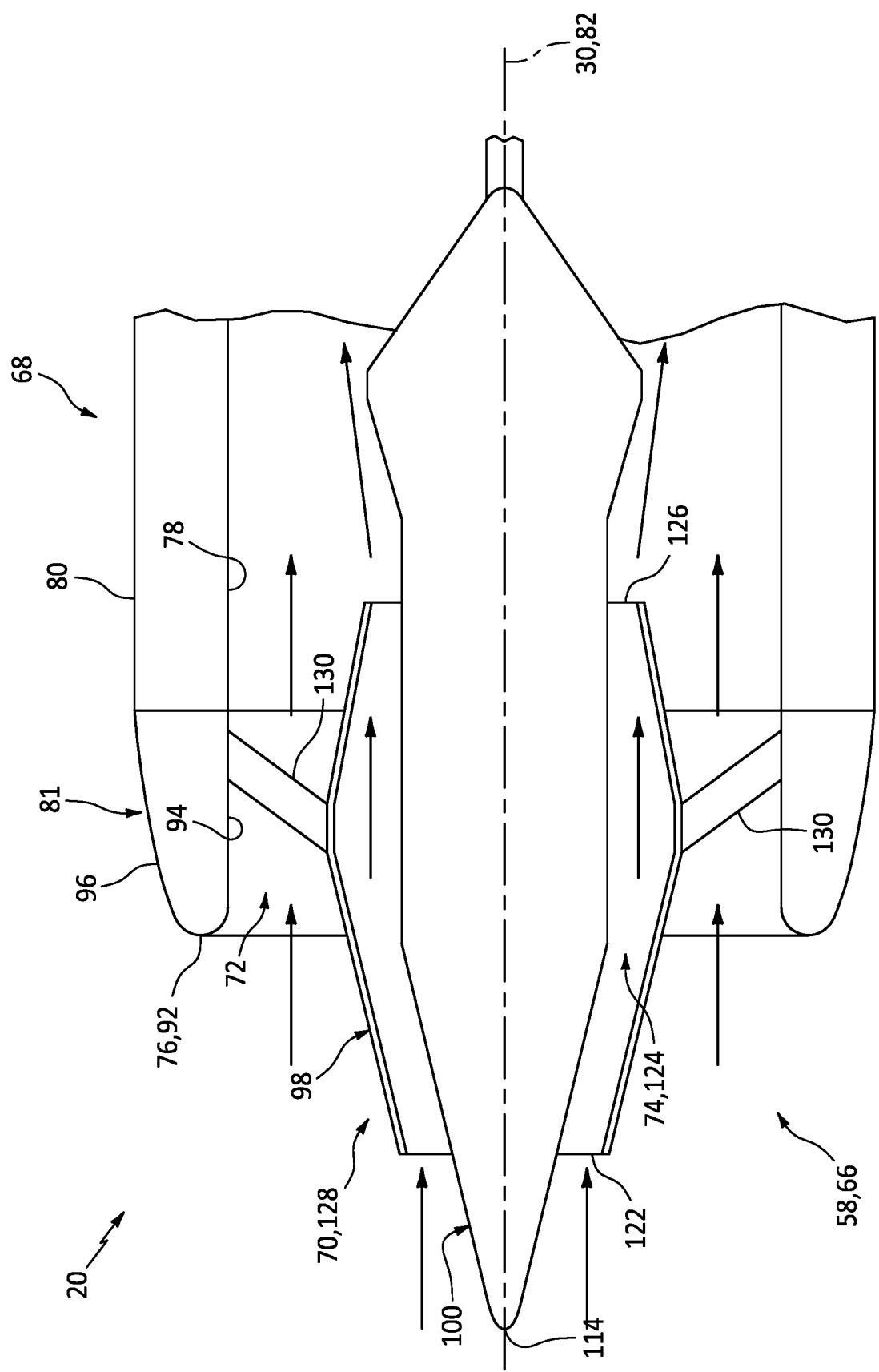
FIG. 3 is a side sectional illustration of the variable area inlet in an open position.

To accommodate the changing mass flow requirements for the aircraft propulsion system 20, the aircraft propulsion system inlet structure 58 is configured as a variable area inlet 66. Referring to FIGS. 2 and 3, this variable area inlet 66 includes a nacelle inlet structure 68 and a center body structure 70. These inlet components 68 and 70 are configured to provide the variable area inlet 66 with an annular outer inlet passage 72 and an annular inner inlet passage 74 (see also FIG. 3). Briefly, the outer inlet passage 72 of FIGS. 2 and 3 is configured as a primary and/or fixed area inlet passage. The inner inlet passage 74 of FIGS. 2 and 3 is configured as a secondary and/or variable area inlet passage.

Referring to FIG. 1, the inlet structure 68 is disposed at a forward, upstream end 76 of the nacelle 24. The inlet structure 68 may be configured as a stationary inlet structure. The inlet structure 68 of FIG. 1 includes a tubular inner barrel 78, a tubular outer barrel 80 and an annular inlet lip 81.

The inner barrel 78 extends circumferentially about (e.g., completely around) an axial centerline 82 (e.g., an axis) of the variable area inlet 66, which centerline 82 may be coaxial with the axial centerline 30. The inner barrel 78 extends axially along the axial centerline 30, 82 between a forward, upstream end 84 of the inner barrel 78 and an aft, downstream end 86 of the inner barrel 78. The inner barrel aft end 86 of FIG. 1 is connected to a forward, upstream end of the outer case 38. The inner barrel 78 may be configured to attenuate noise generated during aircraft propulsion system operation and, more particularly, noise generated by rotation of the fan rotor 48. The inner barrel 78, for example, may include at least one tubular noise attenuating acoustic panel or a circumferential array of arcuate noise attenuating acoustic panels arranged around the axial centerline 30, 82. The present disclosure, however, is not limited to such an acoustic inner barrel configuration.

The outer barrel 80 extends circumferentially about (e.g., completely around) the axial centerline 30, 82. The outer barrel 80 extends axially along the axial centerline 30, 82 between a forward, upstream end 88 of the outer barrel 80 and an aft, downstream end 90 of the outer barrel 80. The outer barrel aft end 90 of FIG. 1 is disposed next to respective (e.g., forward, upstream) ends of a pair of fan cowls of the outer nacelle structure 40.

The inlet lip 81 forms a leading edge 92 of the nacelle 24 as well as an outer peripheral boundary of at least a forward, upstream portion of the outer inlet passage 72. The inlet lip 81 of FIG. 1 has a cupped (e.g., a generally U-shaped or V-shaped) side sectional geometry when viewed, for example, in a plane parallel with and/or coincident with the axial centerline 30, 82. The inlet lip 81 and its cupped side sectional geometry extend circumferentially about (e.g., completely around) the axial centerline 30, 82. The inlet lip 81 of FIG. 1, for example, includes axially overlapping inner and outer lip portions 94 and 96. The inner lip portion 94 is connected to and may be integral with the outer lip portion 96 at and along the nacelle leading edge 92. An aft, downstream end of the inner lip portion 94 is axially adjacent and/or connected to the inner barrel forward end 84. An aft, downstream end of the outer lip portion 96 is axially adjacent and/or connected to the outer barrel forward end 88.

The center body structure 70 of FIGS. 2 and 3 forms an inlet cone and/or an inlet spike of the aircraft propulsion system 20. This center body structure 70 includes a stationary (e.g., fixed) outer body 98 and a moveable (e.g., translating) inner body 100.

Figure 4:
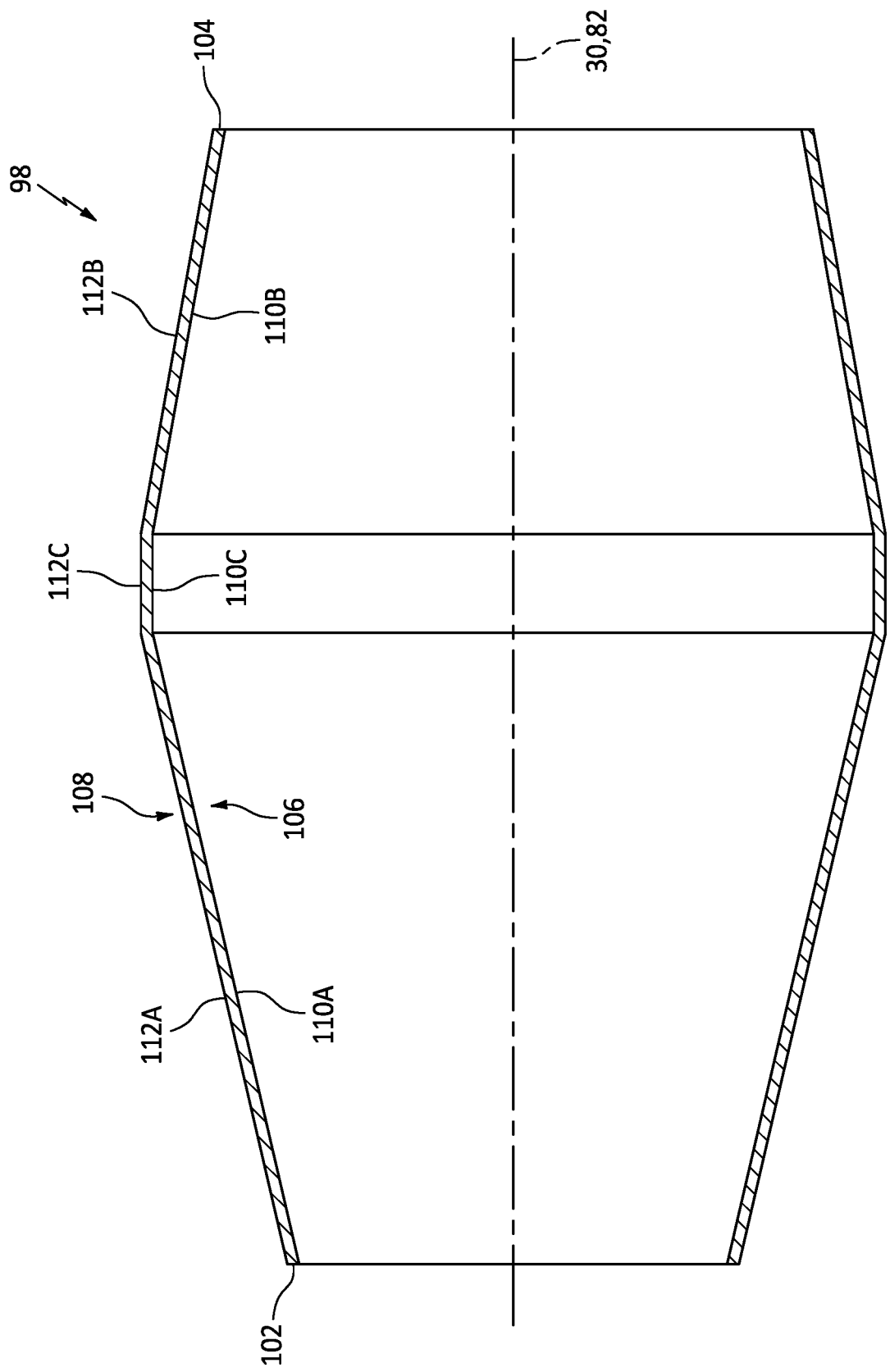
FIG. 4 is a side sectional illustration of an outer body of a center body structure for the variable area inlet.

Referring to FIG. 4, the outer body 98 extends axially along the axial centerline 30, 82 between and to a forward, upstream end 102 (e.g., a leading edge) of the outer body 98 and an aft, downstream end 104 (e.g., a trailing edge) of the outer body 98. The outer body 98 extends circumferentially about (e.g., completely around) the axial centerline 30, 82 providing the outer body 98, for example, with a full-hoop/ tubular body. The outer body 98 extends radially between and to an inner (e.g., interior) side 106 of the outer body 98 and an outer (e.g., exterior) side 108 of the outer body 98.

The outer body inner side 106 may be configured with a double tapered geometry. The outer body 98 of FIG. 4, for example, includes a plurality of inner (e.g., interior) surfaces 110A-C (generally referred to as "110") at the outer body inner side 106. The forward, upstream tapered surface 110A is located at the outer body forward end 102. Note, the term "forward, upstream tapered surface", or "forward tapered surface" for short, may describe a surface that tapers in a forward, upstream direction. The aft, downstream tapered surface 110B is located at the outer body aft end 104. Note, the term "aft, downstream tapered surface", or "aft tapered surface" for short, may describe a surface that tapers in an aft, downstream direction. The plateaued surface 110C is located axially between the forward tapered surface 110A and the aft tapered surface 110B. More particularly, the plateaued surface 110C of FIG. 4 extends axially between and is connected to the forward tapered surface 110A and the aft tapered surface 110B.

The forward tapered surface 110A may have a frustoconical geometry. The forward tapered surface 110A of FIG. 4, for example, tapers radially inward towards the axial centerline 30, 82 as the outer body 98 extends axially in the forward, upstream direction along the axial centerline 30, 82 from the plateaued surface 110C towards (e.g., to) the outer body forward end 102.

The aft tapered surface 110B may have a frustoconical geometry. The aft tapered surface 110B of FIG. 4, for example, tapers radially inward towards the axial centerline 30, 82 as the outer body 98 extends axially in the aft, downstream direction along the axial centerline 30, 82 from the plateaued surface 110C towards (e.g., to) the outer body aft end 104.

The plateaued surface 110C may have a cylindrical geometry. The plateaued surface 110C of FIG. 4, for example, extends axially between and to the forward tapered surface 110A and the aft tapered surface 100B without, for example, significant (or any) radial displacement. More particularly, a radius from the axial centerline 30, 82 to the plateaued surface 110C may remain substantially or completely constant as the plateaued surface 110C extends axially along the axial centerline 30, 82. The plateaued surface 110C may thereby be non-radially tapered.

The outer body outer side 108 may be configured with a double tapered geometry. The outer body 98 of FIG. 4, for example, includes a plurality of outer (e.g., exterior) surfaces 112A-C at the outer body outer side 108. The forward, upstream tapered surface 112A is located at the outer body forward end 102. The aft, downstream tapered surface 112B is located at the outer body aft end 104. The plateaued surface 112C is located axially between the forward tapered surface 112A and the aft tapered surface 112B. More particularly, the plateaued surface 112C of FIG. 4 extends axially between and is connected to the forward tapered surface 112A and the aft tapered surface 112B.

The forward tapered surface 112A may have a frustoconical geometry. The forward tapered surface 112A of FIG. 4, for example, tapers radially inward towards the axial centerline 30, 82 as the outer body 98 extends axially in the forward, upstream direction along the axial centerline 30, 82 from the plateaued surface 112C towards (e.g., to) the outer body forward end 102.

The aft tapered surface 112B may have a frustoconical geometry. The aft tapered surface 112B of FIG. 4, for example, tapers radially inward towards the axial centerline 30, 82 as the outer body 98 extends axially in the aft, downstream direction along the axial centerline 30, 82 from the plateaued surface 112C towards (e.g., to) the outer body aft end 104.

The plateaued surface 112C may have a cylindrical geometry. The plateaued surface 112C of FIG. 4, for example, extends axially between and to the forward tapered surface 112A and the aft tapered surface 112B without, for example, significant (or any) radial displacement. More particularly, a radius from the axial centerline 30, 82 to the plateaued surface 112C may remain substantially or completely constant as the plateaued surface 112C extends axially along the axial centerline 30, 82. The plateaued surface 112C may thereby be non-radially tapered.

Figure 5:
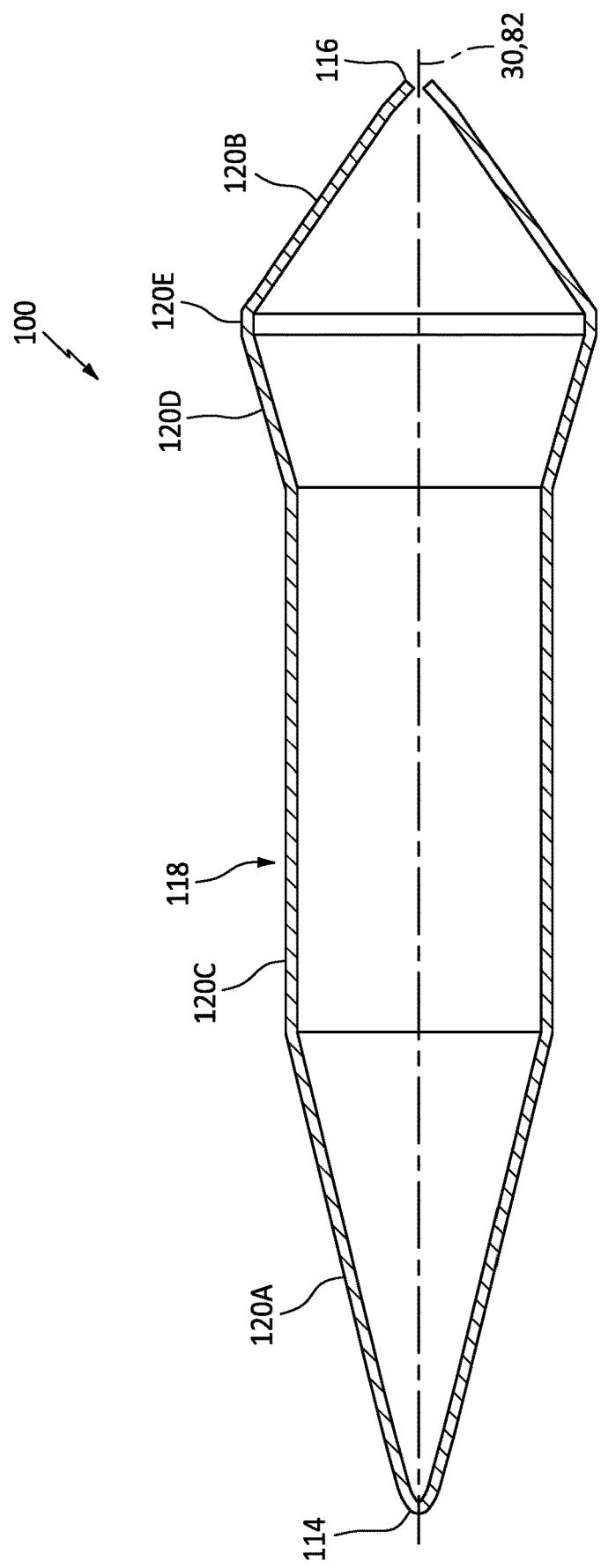
FIG. 5 is a side sectional illustration of an inner body of the center body structure.

Referring to FIG. 5, the inner body 100 extends axially along the axial centerline 30, 82 between and to a forward, upstream end 114 (e.g., a tip, a point) of the inner body 100 and an aft, downstream end 116 (e.g., a trailing end) of the inner body 100. The inner body 100 extends circumferentially about (e.g., completely around) the axial centerline 30, 82. The inner body 100 extends radially to an outer (e.g., exterior) side 118 of the inner body 100.

The inner body outer side 118 may be configured with a multi-tapered geometry. The inner body 100 of FIG. 5, for example, includes a plurality of outer (e.g., exterior) surfaces 120A-E (generally referred to as "120") at the inner body outer side 118. The first forward, upstream tapered surface 120A is located at the inner body forward end 114. The aft, downstream tapered surface 120B is located at the inner body aft end 116. The outer surfaces 120C-E are located axially between the first forward tapered surface 120A and the aft tapered surface 120B. More particularly, the first plateaued surface 120C of FIG. 5 extends axially between and is connected to the first forward tapered surface 120A and the second forward tapered surface 120D. The second forward tapered surface 120D extends axially between and is connected to the first plateaued surface 120C and the second plateaued surface 120E. The second plateaued surface 120E extends axially between and is connected to second forward tapered surface 120D and the aft tapered surface 120B.

The first forward tapered surface 120A may have a conical (or semi-spherical, semi-ellipsoidal, etc.) geometry. The first forward tapered surface 120A of FIG. 5, for example, tapers radially inward towards the axial centerline 30, 82 as the inner body 100 extends axially in the forward, upstream direction along the axial centerline 30, 82 form the first plateaued surface 120C towards (e.g., to) the inner body forward end 114.

The aft tapered surface 120B may have a frustoconical geometry. The aft tapered surface 120B of FIG. 5, for example, tapers radially inward towards the axial centerline 30, 82 as the inner body 100 extends axially in the aft, downstream direction along the axial centerline 30, 82 from the second plateaued surface 120E towards (e.g., to) the inner body aft end 116.

The first plateaued surface 120C may have a cylindrical geometry. The first plateaued surface 120C of FIG. 5, for example, extends axially between and to the first forward tapered surface 120A and the second forward tapered surface 120D without, for example, significant (or any) radial displacement. More particularly, a radius from the axial centerline 30, 82 to the first plateaued surface 120C may remain substantially or completely constant as the first plateaued surface 120C extends axially along the axial centerline 30, 82. The first plateaued surface 120C may thereby be non-radially tapered.

The second forward tapered surface 120D may have a frustoconical geometry. The second forward tapered surface 120D of FIG. 5, for example, tapers radially inward towards the axial centerline 30, 82 as the inner body 100 extends axially in the forward, upstream direction along the axial centerline 30, 82 form the second plateaued surface 120E to the first plateaued surface 120C.

The second plateaued surface 120E may have a cylindrical geometry. The second plateaued surface 120E of FIG. 5, for example, extends axially between and to the second forward tapered surface 120D and the aft tapered surface 120B without, for example, significant (or any) radial displacement. More particularly, a radius from the axial centerline 30, 82 to the second plateaued surface 120E may remain substantially or completely constant as the second plateaued surface 120E extends axially along the axial centerline 30, 82. The second plateaued surface 120E may thereby be non-radially tapered.

Figure 6:
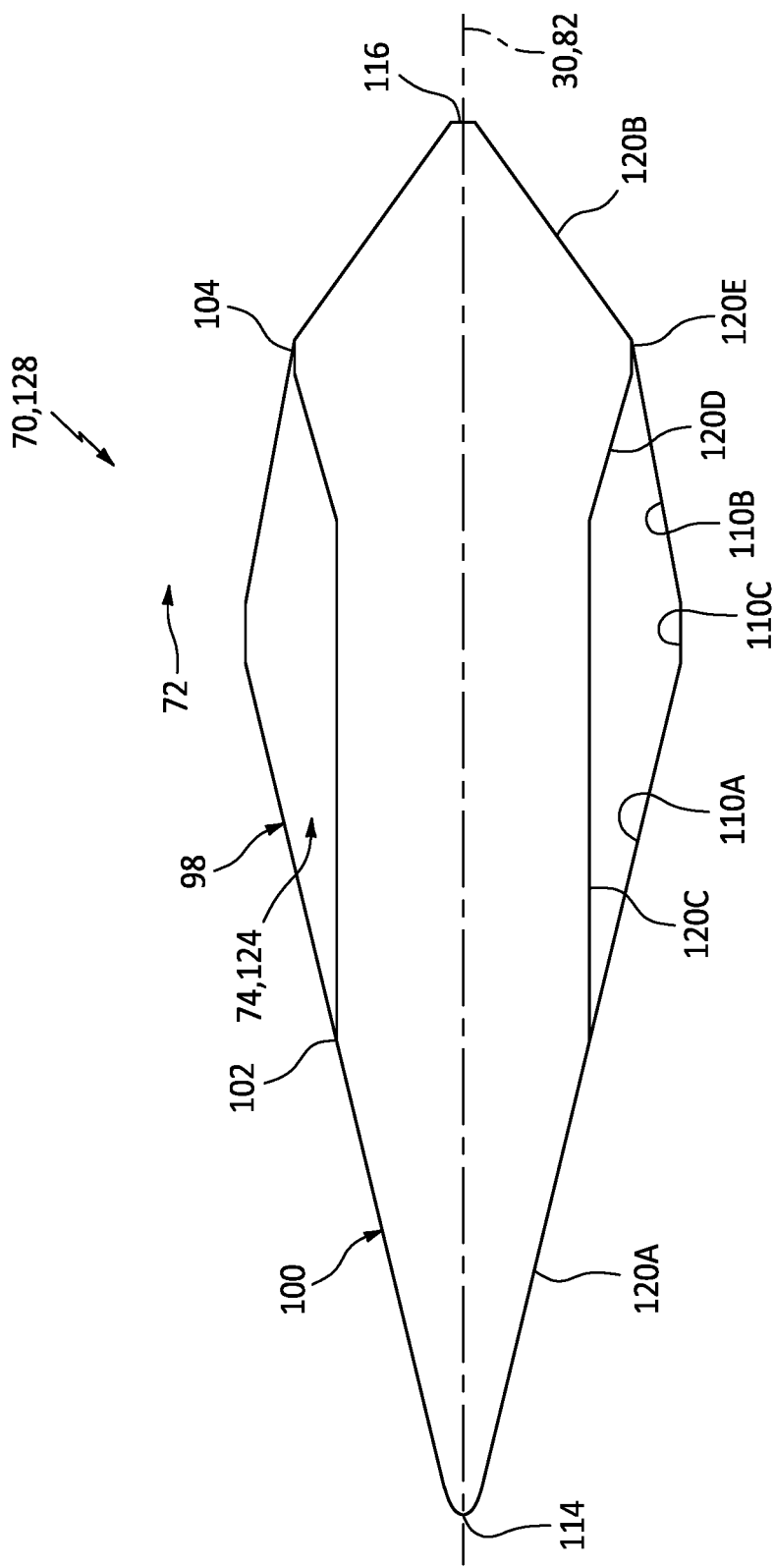
FIG. 6 is a side sectional illustration of the center body structure with the inner body in a closed position.
Figure 7:
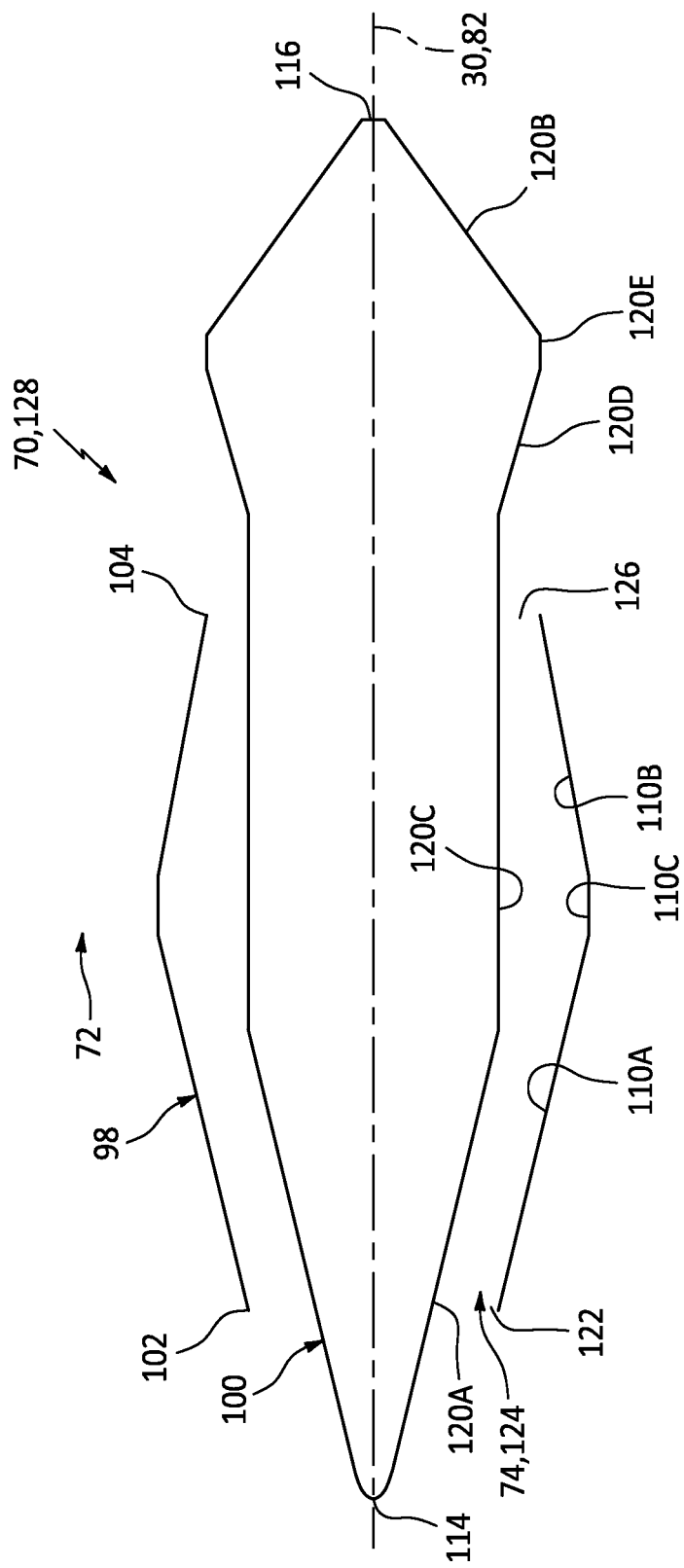
FIG. 7 is a side sectional illustration of the center body structure with the inner body in an open position.

Referring to FIGS. 6 and 7, the inner body 100 is disposed radially within an interior bore of the outer body 98, where the outer body 98 extends circumferentially around and axially overlaps at least a portion of the inner body 100. The inner body 100 projects axially through the outer body 98 and its interior bore. The inner body 100 is configured to move (e.g., axially translate) along the axial centerline 30, 82 between a forward, upstream position (see FIG. 6) and an aft, downstream position (see FIG. 7). More particularly, the inner body 100 is configured to move in the forward, upstream direction to the forward, upstream position of FIG. 6. The inner body 100 is configured to move in the aft, downstream direction to the aft, downstream position of FIG. 7.

In the forward, upstream position of FIG. 6, the inner body 100 is configured to join (e.g., nest, mate, etc.) with the outer body 98. The outer body 98 of FIG. 6, for example, may engage (e.g., contact) or come into very close (e.g., sealing) proximity to the inner body 100 at one or both of the outer body ends 102 and 104. The outer body forward end 102, for example, may engage or come into very close proximity to a portion of the inner body 100 at (e.g., on, adjacent or proximate) an interface between the inner body outer surfaces 120A and 120C. The outer body 98 and the inner body 100 may thereby effectively close an inlet 122 (see FIG. 7) to an annular cavity 124 formed radially between the outer body inner side 106 and the inner body outer side 118. Similarly, the outer body aft end 104 may engage or come into very close proximity to a portion of the inner body 100 at (e.g., on, adjacent or proximate) an interface between the inner body outer surface 120D and 120E. The outer body 98 and the inner body 100 may thereby effectively close an outlet 126 (see FIG. 7) to the annular cavity 124.

In the aft, downstream position of FIG. 7, the inner body 100 is configured to separate (e.g., disengage) from the outer body 98. The outer body 98 of FIG. 7, for example, is physically displaced/separated from the inner body 100. The outer body forward end 102, for example, is separated from the inner body 100 by an annular, radially extending gap. The outer body 98 and the inner body 100 may thereby effectively open the inlet 122 to the annular cavity 124. Similarly, the outer body aft end 104 is separated from the inner body 100 by an annular, radially extending gap. The outer body 98 and the inner body 100 may thereby effectively open the outlet 126 to the annular cavity 124. This annular cavity 124 at least partially or completely forms the inner inlet passage 74 within the center body structure 70.

With the foregoing configuration, the center body structure 70 is configured as a valve 128 such as, for example, a needle and seat valve. The inner body 100 may be configured as a translating needle for the valve 128. The outer body 98 may be configured as a fixed seat for the valve 128.

Referring to FIGS. 2 and 3, the valve 128 is configured to regulate the flow of air through the inner inlet passage 74 to the inlet duct 60 (see FIG. 1). For example, in the forward, upstream position of FIG. 2, the valve 128 is configured to (e.g., fully, completely) close the inlet 122 and/or the outlet 126 and thereby (e.g., fully, completely) close the inner inlet passage 74. The valve 128 may thereby fluidly decouple the inner inlet passage 74 from the inlet duct 60 (see FIG. 1) when the inner body 100 is at its forward, upstream position. However, in the aft, downstream position of FIG. 3, the valve 128 is configured to (e.g., fully, completely) open the inlet 122 and the outlet 126 and thereby (e.g., fully, completely) open the inner inlet passage 74. The valve 128 may thereby fluidly couple the inner inlet passage 74 with the inlet duct 60 (see FIG. 1) when the inner body 100 is at its aft, downstream position. While the inner body 100 is described above as moving between its forward, upstream position (see FIG. 2) and its aft, downstream position (see FIG. 3), it is contemplated the inner body 100 may also move to one or more intermediate positions axially therebetween in order to variably modulate/regulate the flow of air through the inner inlet passage 74 to the inlet duct 60 (see FIG. 1).

The center body structure 70 of FIGS. 2 and 3 is disposed radially within an interior bore of the nacelle 24 and its inlet structure 68, where the inlet structure 68 extends circumferentially around and axially overlaps at least a portion of the center body structure 70. The center body structure 70 projects axially out of the inlet structure 68 and its interior bore to the forward end 114. A forward, upstream portion of the outer body 98 of FIGS. 2 and 3, for example, is forward, upstream of the nacelle 24 and its inlet structure 68. A forward, upstream portion of the inner body 100 of FIGS. 2 and 3 may also be forward, upstream of the nacelle 24 and its inlet structure 68.

The outer body 98 may be fixedly connected to the nacelle 24. The outer body 98 of FIGS. 2 and 3, for example, is structurally tied to the nacelle 24 and its inlet structure 68 by one or more struts 130. The outer body 98 may thereby be configured as a stationary component within the aircraft propulsion system 20.

The outer body 98 is radially spaced from the inlet structure 68 by an annular gap. This annular gap at least partially or completely forms the outer inlet passage 72 between (a) the center body structure 70 and its outer body 98 and (b) the inlet structure 68.

During aircraft operation at supersonic speeds (or other low mass flow conditions), the inner body 100 is moved to its forward, upstream position of FIG. 2. At this position, the inner inlet passage 74 is closed off from the inlet duct 60. The inlet duct 60 of FIG. 1 thereby directs (e.g., only) the air received from the outer inlet passage 72 into the core flowpath 62 and/or the bypass flowpath 44. However, during aircraft operation at subsonic speeds (or other high mass flow conditions), the inner body 100 is moved to its aft, downstream position of FIG. 3. At this position, the inner inlet passage 74 is opened to the inlet duct 60. The inlet duct 60 of FIG. 1 thereby directs the air received from the outer inlet passage 72 as well as the air received from the inner inlet passage 74 (see FIG. 3) into the core flowpath 62 and/or the bypass flowpath 44. Of course, in some modes of operation, the air received by the inlet duct 60 from the inner inlet passage 74 may be modulated/regulated by moving (e.g., axially translating) the inner body 100 to one or more intermediate positions, which modes may occur at subsonic speeds and/or supersonic speeds.

The inner body 100 of the center body structure 70 may be configured to move using various techniques. For example, in some embodiments, the inner body 100 or a support structure connected thereto may ride on one or more axially extending tracks. An actuator may then push or pull the inner body 100/the support structure along the tracks. The actuator may be a linear actuator or a four-bar kinematic mechanism; however, the present disclosure is not limited thereto. For example, in some embodiments, the inner body 100 may be connected to a screw mechanism. This screw mechanism may be rotated via a motor, where the screw mechanism translates rotational movement to provide axial movement of the inner body 100. In such embodiments, the inner body 100 may rotate with the screw mechanism as it translates axially along the axial centerline 30, 82. Of course, various other devices and systems are known in the art for facilitating movement of a body, and the present disclosure is not limited to any particular ones thereof.

In some embodiments, a (e.g., minimum, choke point) cross-sectional flow area of the outer inlet passage 72 may be different (e.g., greater or less) than a (e.g., minimum, choke point) cross-sectional flow area of the inner inlet passage 74. These flow areas may each be measured in a plane that is perpendicular to the axial centerline 30, 82. In other embodiments, the cross-sectional flow area of the outer inlet passage 72 may be equal to the cross-sectional flow area of the inner inlet passage 74.

Figure 8:
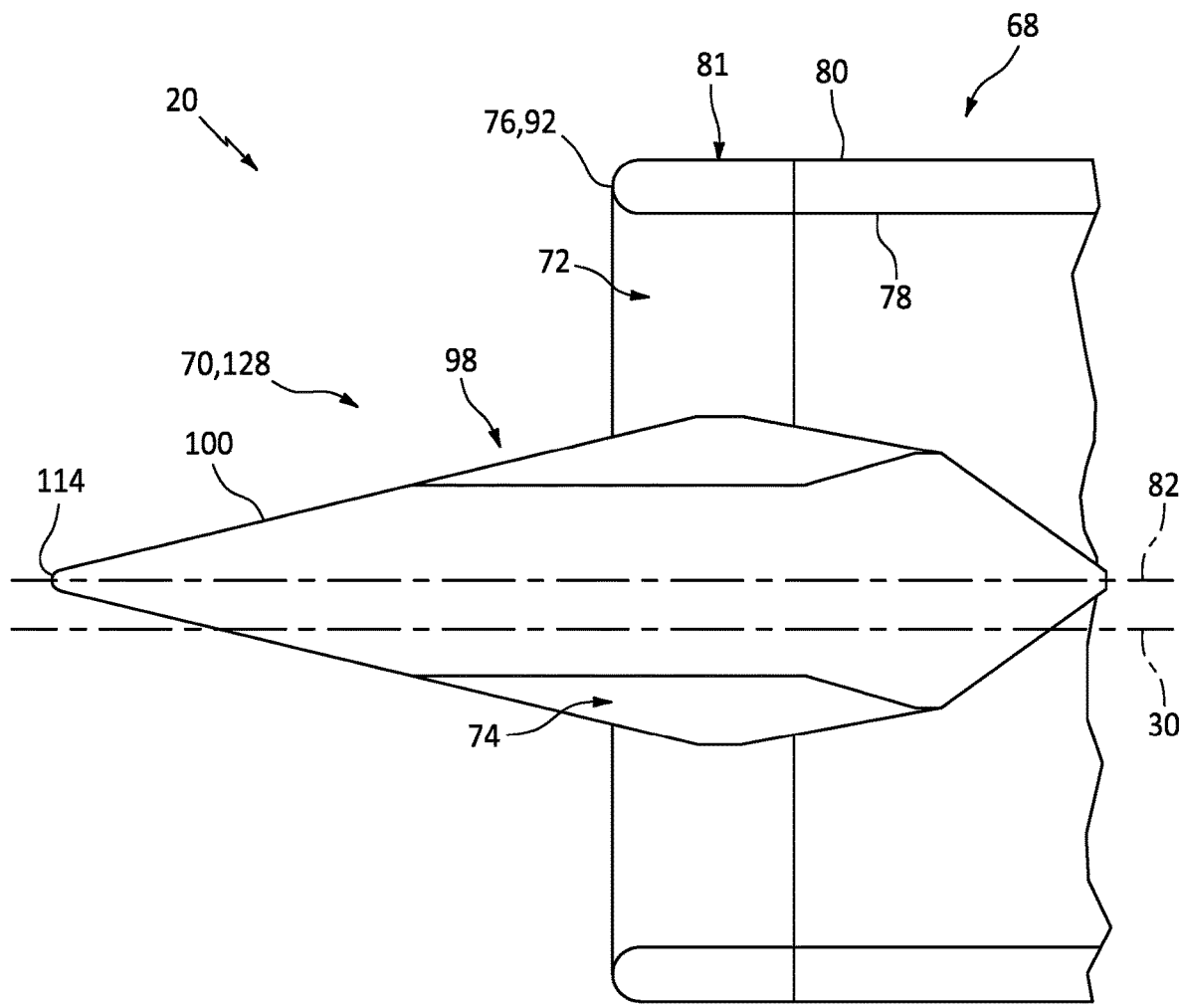
FIG. 8 is a side sectional illustration of another variable area inlet.

In some embodiments, the axial centerline 82 of the variable area inlet 66 (or one or more of its components) is coaxial with the axial centerline 30 of the aircraft propulsion system 20 and its gas turbine engine 22 as described above. However, in other embodiments, the axial centerline 82 of the variable area inlet 66 (or one or more of its components) may be eccentric/non-coaxial with the axial centerline 30 of the aircraft propulsion system 20 and its gas turbine engine 22 as shown, for example, in FIG. 8. More particularly, the axial centerline 82 of the variable area inlet 66 (or one or more of its components) may be displaced and/or angularly offset from the axial centerline 30.

The inner body 100 is described above as a moveable structure, and the outer body 98 is described above as a stationary structure. However, it is contemplated that the functionality/operation of these bodies may be reversed. For example, in some embodiments, the inner body 100 may be configured as a stationary structure, and the outer body 98 may be configured as a moveable structure. It is also contemplated that the stationary body may alternatively be configured to also move in order to provide, for example, further adjustment/fine tuning of the variable area inlet flow capacity.

The aircraft propulsion system 20 and its variable area inlet 66 may be configured with various gas turbine engines other than the one described above. The gas turbine engine, for example, may be configured as a geared or a direct drive turbine engine. The gas turbine engine may be configured with a single spool, with two spools (e.g., see FIG. 1), or with more than two spools. The gas turbine engine may be configured as a turbofan engine, a turbojet engine or any other type of turbine engine. The present invention therefore is not limited to any particular types or configurations of gas turbine engines. The present disclosure is also not limited to applications where the aircraft is capable to traveling supersonic speeds.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
    a variable area inlet comprising an inlet structure and a center body structure, the inlet structure extending circumferentially about the center body structure with an outer inlet passage radially between the center body structure and the inlet structure, the center body structure comprising an outer body and an inner body, the outer body extending circumferentially about the inner body with an inner inlet passage radially between the inner body and the outer body, and the inner body configured to move along a centerline relative to the outer body between a first position and a second position; and
    an inlet duct fluidly coupled with the outer inlet passage when the inner body is in the first position, the inlet duct fluidly coupled with the outer inlet passage and the inner inlet passage when the inner body is in the second position, and the inlet duct configured to direct air received from the outer inlet passage and the inner inlet passage into a core flowpath of the aircraft propulsion system when the inner body is in the second position.

2. The assembly of claim 1, wherein the center body structure is configured to fluidly decouple the inlet duct from the inner inlet passage when the inner body is in the first position.

3. The assembly of claim 1, wherein the center body comprises a needle and seat valve configured to regulate air flow through the inner inlet passage, and the needle and seat valve includes the outer body and the inner body.

4. The assembly of claim 1, wherein the outer inlet passage comprises a fixed area passage.

5. The assembly of claim 1, wherein the outer inlet passage comprises an annular outer inlet passage.

6. The assembly of claim 1, wherein the inner inlet passage comprises an annular inner inlet passage.

7. The assembly of claim 1, wherein the outer body comprises a fixed tubular sleeve.

8. The assembly of claim 1, further comprising one or more struts fixedly connecting the outer body to the inlet structure.

9. The assembly of claim 1, wherein the outer body extends axially along the centerline between an upstream end of the outer body and a downstream end of the outer body, and the center body is configured to close the inner inlet passage when the outer body engages the inner body at the upstream end of the outer body.

10. The assembly of claim 1, wherein the outer body includes a first outer surface and a second outer surface, the first outer surface tapers radially inward as the outer body extends axially in a first direction along the centerline, and the second outer surface tapers radially inward as the outer body extends axially in a second direction along the centerline.

11. The assembly of claim 1, wherein the inner body includes a first outer surface, a second outer surface and a third outer surface, the first outer surface tapers radially inward as the inner body extends axially in a first direction along the centerline, the second outer surface tapers radially inward as the inner body extends axially in the first direction along the centerline, and the third outer surface, which is disposed axially between the first outer surface and the second outer surface, is non-radially tapered.

12. The assembly of claim 1, wherein a flow area of the outer inlet passage is different than a flow area of the inner inlet passage.

13. An assembly for an aircraft propulsion system, comprising:
    a variable area inlet comprising an inlet structure and a center body structure, the inlet structure extending circumferentially about the center body structure with an outer inlet passage radially between the center body structure and the inlet structure, the center body structure comprising an outer body and an inner body, the outer body extending circumferentially about the inner body with an inner inlet passage radially between the inner body and the outer body, and the inner body configured to move along a centerline relative to the outer body between a first position and a second position; and
    an inlet duct fluidly coupled with the outer inlet passage when the inner body is in the first position, and the inlet duct fluidly coupled with the outer inlet passage and the inner inlet passage when the inner body is in the second position;
    wherein the outer body extends axially along the centerline between an upstream end of the outer body and a downstream end of the outer body, and the center body is configured to close the inner inlet passage when the outer body engages the inner body at the downstream end of the outer body.

14. An assembly for an aircraft propulsion system, comprising:
    a variable area inlet comprising an inlet structure and a center body structure, the inlet structure extending circumferentially about the center body structure with an outer inlet passage radially between the center body structure and the inlet structure, the center body structure comprising an outer body and an inner body, the outer body extending circumferentially about the inner body with an inner inlet passage radially between the inner body and the outer body, and the inner body configured to move along a centerline relative to the outer body between a first position and a second position; and
    an inlet duct fluidly coupled with the outer inlet passage when the inner body is in the first position, the inlet duct fluidly coupled with the outer inlet passage and the inner inlet passage when the inner body is in the second position, and the inlet duct configured to direct air received from the outer inlet passage and the inner inlet passage into a bypass flowpath of the aircraft propulsion system when the inner body is in the second position.

15. An assembly for an aircraft propulsion system, comprising:
    a variable area inlet comprising an inlet structure, an outer body and an inner body, the inlet structure extending circumferentially about the outer body with an outer inlet passage formed by and radially between the inlet structure and the outer body, the outer body extending circumferentially about the inner body with an inner inlet passage formed by and radially between the outer body and the inner body, a component of the variable area inlet configured to move along a centerline between a first position and a second position, and the component of the variable area inlet comprising the inner body or the outer body; and a gas turbine engine comprising a compressor section configured to receive air from the outer inlet passage and the inner inlet passage when the component of the variable area inlet is at least in the second position.

* * * * *